(12) United States Patent
Ham

(10) Patent No.: US 7,936,576 B2
(45) Date of Patent: May 3, 2011

(54) POWER CONTROLLER

(75) Inventor: Nicholas J. Ham, Stockport (GB)

(73) Assignee: NXP B.V., Eindhoven (NL)

( * ) Notice: Subject to any disclaimer, the term of this patent is extended or adjusted under 35 U.S.C. 154(b) by 791 days.

(21) Appl. No.: 10/570,693

(22) PCT Filed: Aug. 27, 2004

(86) PCT No.: PCT/IB2004/051587
§ 371 (c)(1),
(2), (4) Date: Nov. 16, 2006

(87) PCT Pub. No.: WO2005/024539
PCT Pub. Date: Mar. 17, 2005

(65) Prior Publication Data
US 2007/0063680 A1    Mar. 22, 2007

(30) Foreign Application Priority Data

Sep. 5, 2003  (GB) .................................. 0320835.2
Jan. 29, 2004 (GB) .................................. 0402048.3

(51) Int. Cl.
*H02M 7/04* (2006.01)
(52) U.S. Cl. .......................... 363/143; 323/300; 363/142
(58) Field of Classification Search .................. 323/299, 323/300, 303; 307/18, 38, 29; 363/143
See application file for complete search history.

(56) References Cited

U.S. PATENT DOCUMENTS

| 4,103,388 A | | 8/1978 | DeVitis |
| 4,315,305 A | * | 2/1982 | Siemon ............................ 363/88 |
| 4,323,835 A | | 4/1982 | Lee |
| 4,433,368 A | * | 2/1984 | Choi .............................. 363/45 |
| 4,654,538 A | | 3/1987 | Lethellier |
| 4,665,323 A | * | 5/1987 | Russell et al. .................. 307/75 |
| 5,107,918 A | * | 4/1992 | McFarlane et al. ........... 165/238 |
| 5,162,984 A | | 11/1992 | Castagnet et al. |
| 5,523,631 A | | 6/1996 | Fishman et al. |
| 5,864,225 A | * | 1/1999 | Bryson ......................... 323/268 |
| 5,886,422 A | | 3/1999 | Mills |

(Continued)

FOREIGN PATENT DOCUMENTS

GB     2 098 368     11/1982

*Primary Examiner* — Edward Tso
*Assistant Examiner* — Arun Williams

(57) ABSTRACT

A power controller (10) includes a controller (11) and a trigger circuit (12). When the voltage of a power supply received at terminals T1 exceeds a threshold, for example 120 V RMS, reverse-connected Zener diodes Z1 to Z3 conduct and switch on a transistor Q1. This results in a transistor Q2 being switched off and a normally open relay SW1 remaining open. The switching or triggering phase angle of a triac THY1 thus is determined by the speed at which a capacitor C4 is charged to a triggering voltage by current flowing through resistors R6, R7, R8 and VR1. In this situation, the triggering phase angle is such that a 240 V AC input supply provides an effective 110 V AC output at terminals T3 when VR1 is at maximum power setting (zero Ohms). When the voltage of the received power supply is less than the threshold, the transistor Q1 is switched off and the relay SW1 is activated. This bypasses resistor R6 and causes the switching or triggering phase angle to adopt a value of about zero degrees when VR1 is at maximum power setting, such that the voltage of the output power supply terminals T3 is substantially the same as that received at terminals T1.

13 Claims, 2 Drawing Sheets

U.S. PATENT DOCUMENTS

Figure 1:
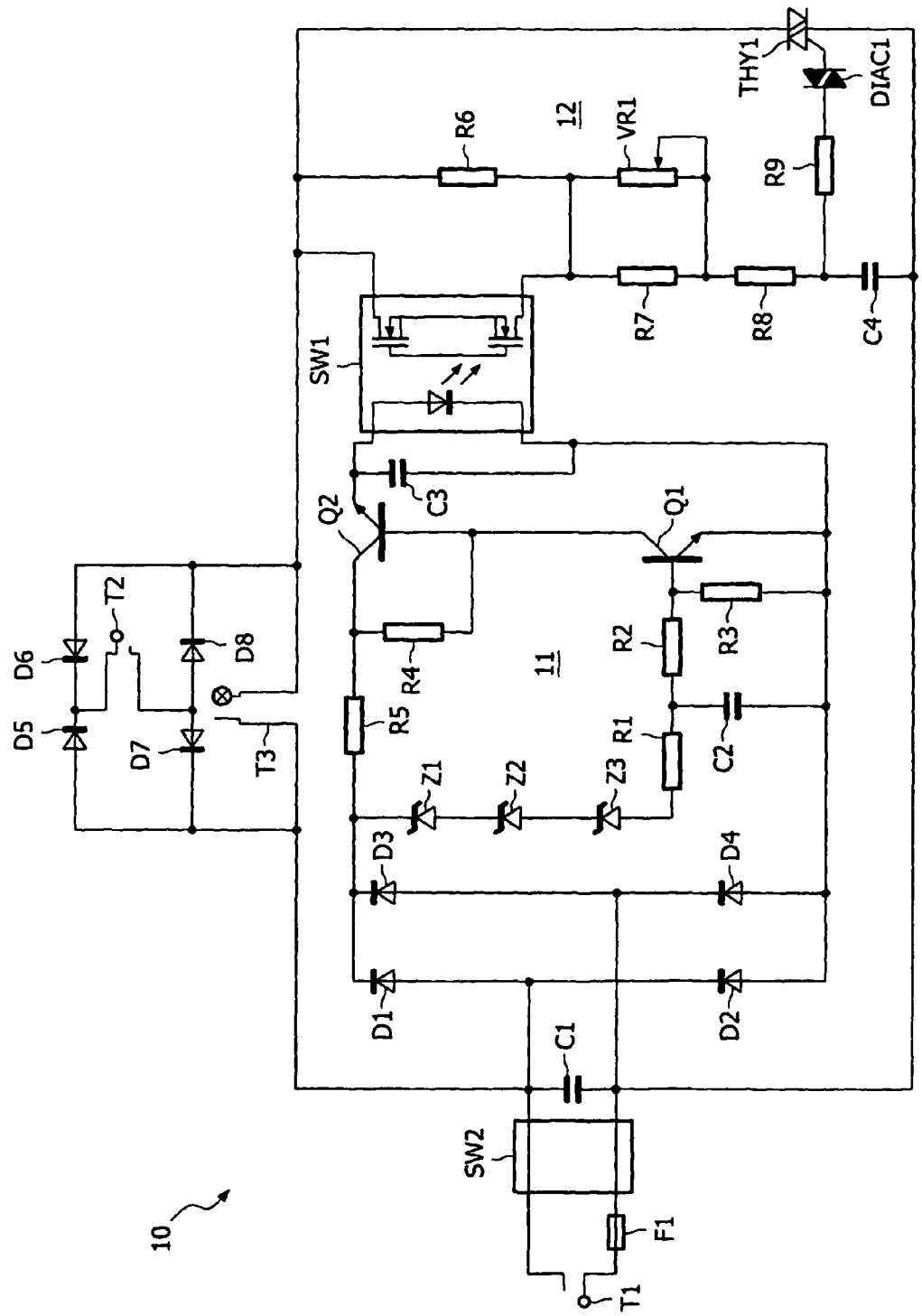

| | | | |
|---|---|---|---|
| 5,955,794 A * | 9/1999 | Schulz et al. | 307/127 |
| 6,320,940 B1 * | 11/2001 | Oi | 379/27.01 |
| 6,674,657 B2 * | 1/2004 | Nagaya et al. | 363/50 |
| 2003/0085621 A1 * | 5/2003 | Potega | 307/18 |
| 2003/0122501 A1 * | 7/2003 | Ervin et al. | 315/248 |
| 2004/0004853 A1 * | 1/2004 | Na | 363/143 |

* cited by examiner

POWER CONTROLLER

The present invention relates to a power controller for connecting a load to power supplies of different voltage ratings.

Mains power supply voltages differ in different parts of the world. For example, the AC mains supply voltage in the United Kingdom is 230-240V, whilst the mains supply voltage is 110-120V in other countries. Electrical equipment manufacturers supplying markets with different mains supplies therefore have to make distinct versions of a product to suit the different supplies, complicating the manufacturing process.

U.S. Pat. No. 5,886,422 and U.S. Pat. No. 4,654,538 disclose power supplies that provide 220V full sine wave output for 110V or 220V AC input. U.S. Pat. No. 5,162,984 discloses a power supply with an AC line harmonic current correction. GB-A-2098368 provides a current limited fixed DC output for a range of input AC voltages. U.S. Pat. No. 4,103,388 provides a wide range of AC voltages and frequencies at an output in response to a wide range of AC voltages and frequencies at an input. The power supply of this document is used to control the speed of many different motor types, including DC motors. Power supplies are known also to be used for delivery of power to incandescent (filament) lamps.

The present invention provides a power controller adapted to transfer power to a given load from power supplies of different voltages.

According to a first aspect of the invention, there is provided a power controller for controlling the power supplied from power supplies of different voltage ratings to a load having an input voltage threshold, comprising a controller operable to control a trigger circuit to have a triggering phase angle greater when the power supply voltage input to the controller exceeds a threshold dependent on the input voltage threshold of the load than when the threshold is not exceeded.

According to a second aspect of the invention, there is provided a power controller for controlling the power supplied from power supplies of different voltage ratings to a load having an input voltage threshold, comprising a controller operable to control a trigger circuit such that the trigger phase angle of the trigger circuit is retarded when the power supply voltage input to the controller exceeds the input voltage threshold of the load.

The invention can provide a power controller suitable for use with power supplies of different voltage ratings, which is relatively inexpensive to produce. Threshold switching between low and high input voltages can be performed automatically, in contrast to the prior art.

The controller can effect change in the resistance of a resistive circuit forming part of the trigger circuit. This provides a convenient way of changing the triggering phase angle of the trigger circuit. The change in the resistance of resistive circuit advantageously is a step change, which provides a particularly simple arrangement, but this is not essential.

The resistive circuit can be operable to provide current for charging a capacitive circuit connected to the control electrode of a switching semiconductor circuit or device forming part of the trigger circuit. In the embodiments, a capacitor is connected to a control electrode of a diac, in turn controlling a triac or a thyristor.

The power controller may be arranged such that, before energization of the power controller, the resistive circuit has a resistance corresponding to that present when the voltage of the input power supply exceeds the input voltage threshold of the load. This provides some protection for components when the input supply voltage is high.

The controller can operate a switch forming part of the resistive circuit. This can be convenient in providing a step change in the triggering phase angle. The switch can be a relay, for example an electromechanical relay or a solid-state relay such as a photoMOS relay. The switch can be normally open, providing a degree of inrush current protection.

The controller can include a circuit operable to produce a step signal change, for effecting the change in the resistance of the resistive circuit when the voltage of the input power supply exceeds the input voltage threshold of the load. This can make the controller particularly useful where the input supply voltage can be assumed to take one of a small number, for example two, of values. Advantageously, this circuit includes one or more Zener diodes. This can be an inexpensive way of detecting whether a voltage threshold is exceeded.

The resistive circuit may include a potentiometer. Such could be used to vary the power supplied to the load. The potentiometer may be connected with a power switch such that operation of the power switch controls the potentiometer temporarily to adopt a high resistance. This can provide additional protection against inrush currents.

The invention also provides an electrical device including a power controller as described.

Figure 2:
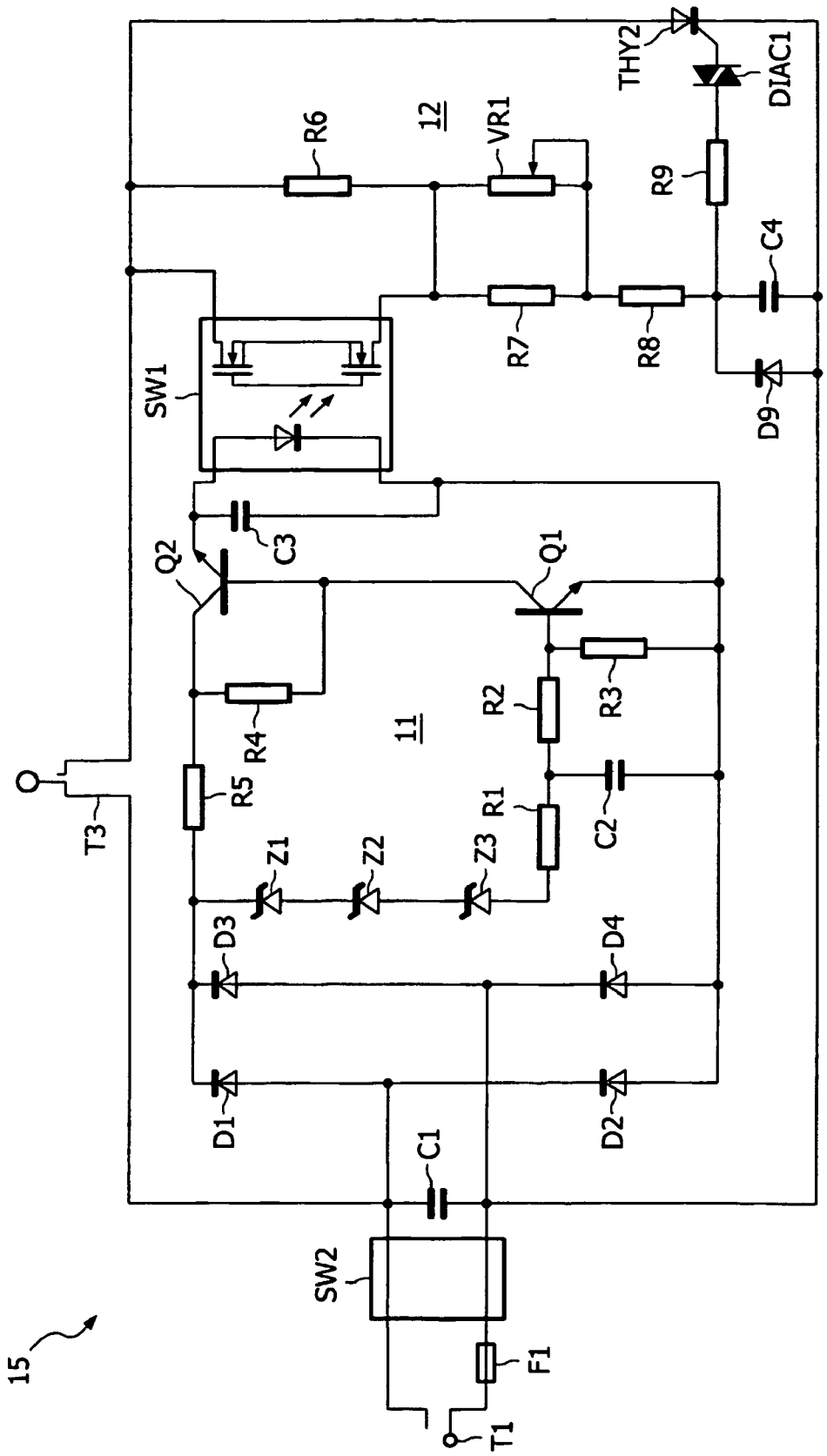

Embodiments of the invention will now be described by way of example and with reference to the accompanying drawings in which:

FIGS. 1 and 2 illustrate alternative embodiments of power controllers according to the present invention.

The variable power controller of FIG. 1 includes input terminals T1, which are connected to the main circuit by a fuse F1. In the Figure, the live terminal of the input terminals T1 is shown lowermost, and the uppermost terminal is the neutral terminal. A power switch SW2 is interposed between the terminals and the power controller circuit, and it is this power switch that is used to operate the circuit.

Generally speaking, the power controller is configured to supply a load connected to output terminals T3 with a power supply at 110V at 50 Hz or 60 Hz. The power supply received at the input terminals T1 can be 110V or 240V at 50 Hz or 60 Hz.

The power controller 10 can be considered to be reconstituted by two main parts, namely a controller 11 and a trigger circuit 12. The controller 11 and the trigger circuit 12 each are connected to receive the power supplied to the input terminals T1. A first capacitor C1 is connected across the output terminals of the power switch SW2. The first capacitor C1 is a class X2 capacitor, which provides rudimentary filtering of radio frequency interference generated by the circuit and its load.

The controller 11 is connected across the first capacitor C1 by a rectifying diode bridge comprising first to fourth diodes D1 to D4, which provide a full sine wave rectified power supply to the controller 11. Flowing from the positive to the negative end of the diode bridge constituted by the first to fourth diodes D1 to D4 are, in series, first to third Zener diodes Z1 to Z3, a first resistor R1 and a second capacitor C2. The junction between the first resistor R1 and the second capacitor C2 is connected to the base of an NPN transistor Q1 via a second, base current limiting, resistor R2. A third resistor R3 is connected across the base and emitter electrodes of the first transistor Q1.

The effect of this part of the controller 11 is to switch the first transistor 1 on when the voltage provided by the rectifier of the first to fourth diodes D1 to D4 is sufficient to cause a reverse conduction of the series-connected Zener diodes Z1 to Z3. The second capacitor C2 effects smoothing of the rectified signal, to prevent the transistor Q1 being switched twice in every cycle of the input power signal. The voltage that is required on the input power signal to switch on the transistor Q2 is determined by the breakdown voltages of the Zener diodes. For example, providing three Zener diodes of the type BZX79C56 provides a threshold voltage of around 120V RMS. If the received power signal has a voltage exceeding 120V RMS, this results in the first transistor Q1 being switched on. Different voltage thresholds can be obtained by using different Zener chain voltages.

The first resistor R1 has a resistance of 10 kOhm, the second resistor R2 a resistance of 470 kOhm, the third resistor R3 a resistance of 100 kOhm and the second capacitor C2 has a capacitance of 100 nF. The correct specification of these four components causes them to have negligible effect on the threshold voltage, which is governed essentially by the Zener voltage drop alone.

When the first transistor Q1 is not switched on, it has a high potential difference across its collector and emitter electrodes. In this instance, a second transistor Q2, also forming part of the controller 11, is switched on. The second transistor Q2 has its base electrode connected directly to the emitter electrode of the first transistor Q1, and a fourth resistor R4 connected across its base and collector electrodes. When the voltage across the collector and emitter electrodes of the first transistor Q1 is high, the second transistor Q2 is biased on by virtue of the fourth resistor R4. The collector electrode of the second transistor Q2 is connected to the positive side of the rectifier formed by the first to fourth diodes D1 to D4 by a fifth resistor R5. For example, the fourth resistor may have a value of 100 kOhm and the fifth resistor may have a value of 33 kOhm. The emitter electrode of the second transistor Q2 is connected to the emitter electrode of the first transistor Q1 via the input LED contacts of a photoMOS relay SW1. A third, electrolytic, capacitor C3 having a capacitance of 100 micro F is connected across the input LED contacts of the photoMOS relay SW1.

The effect of this is that, when the first transistor Q1 is switched off, the second transistor Q2 is switched on and the photoMOS relay SW1 is activated. The input current flowing through the photoMOS relay SW1 is limited by the fifth resistor R5. Because of its function, the second transistor Q2 is of the high voltage, low current type, for example BUJ100. The first transistor Q1 does not need to be of the high voltage type, and can for example, be a BC547 type transistor.

The photoMOS relay SW1 is of the normally open type (e.g., AQY210 EH from NAiS), and is closed by the current flow through its internal light emitting diode. Current ripple is removed by the third capacitor C3, which provides stable activation of the photoMOS relay.

Another advantage of controller 11 is its very low power consumption and low heat generation when connected to 110V or 240V supplies. This permits embodiment in the most compact systems where cooling or ventilation are minimal or non-existent.

The switched side of the photoMOS relay forms part of the trigger circuit 12. The trigger circuit 12 includes a resistor chain formed by a sixth resistor R6, a seventh resistor R7, a potentiometer VR1 and an eighth resistor R8. The seventh resistor R7 and the potentiometer VR1 are connected in parallel to each other, and together with the sixth and eighth resistors R6, R8 form a three-stage series resistor chain. The end of the third stage of the resistor chain, comprised by the eighth resistor R8, is connected to the live one of the terminals T1 by a fourth capacitor C4. The beginning of the first stage of the resistor chain, formed by the sixth resistor R6, is connected to the live terminal of the live one of the output terminals T3. The neutral one of the output terminals T3 is connected directly to the neutral one of the input terminals T1.

The switched side of the photoMOS relay SW1 is connected in parallel across the sixth resistor R6.

A triac THY1 has its main terminals connected in series between the input power terminals T1 and the output terminals T3. In particular, the triac Main Terminal 1 is connected to input power terminal T1 Live and triac Main Terminal 2 is connected to output power terminal T3 Live. The gate of the triac THY1 is fed by a diac DIAC1 and a ninth resistor R9, which is connected in series between the node connecting the eighth resistor R8 and the fourth capacitor C4 and the diac DIAC1. The diac DIAC1 conducts when the voltage across the fourth capacitor C4 reaches the breakover voltage of the diac, which typically is in the region of 30V. Accordingly, the phase of the input power signal at which the triac THY1 becomes switched on is determined by the resistance of the resistor chain formed by the sixth to eighth resistors R6, R7, R8, the potentiometer VR1 and the photoMOS relay SW1.

When the input supply voltage is less than 120V RMS, Q1 is switched off and Q2 is switched on. Accordingly, the photoMOS relay SW1 is closed, bypassing the sixth resistor R6. Here, the switching or triggering phase angle of the triac THY1 is relatively small since the fourth capacitor C4 charges quickly and thus switches the diac DIAC1 early in the cycle. This results in substantially all of the voltage of the input power supply from terminals T1 being provided to the output terminals T3 when VR1 is at full power setting, i.e. having zero resistance. Accordingly, it can be said that a 110V supply is provided on the basis of a received 110V supply.

When the input power received at the terminal T1 exceeds 120V RMS, the first transistor Q1 is switched on, and thus the second transistor Q2 is switched off. In this instance, the switched side of the photoMOS relay SW1 is open, so the sixth resistor R6 contributes to the resistance of the resistor chain. In this state, the resistance of the resistor chain is significantly greater than when the sixth resistor R6 does not contribute. This greater resistance causes the fourth capacitor C4 to charge more slowly, which causes the triac THY1 to become switched on at an increased, or retarded, phase angle compared to the situation when the photoMOS relay SW1 is closed. Put another way, the controller 11 controls the trigger circuit 12 such that the trigger phase angle of the trigger circuit is retarded when the power supply voltage input to the controller exceeds the input voltage threshold of the load, as determined by the conduction voltage of the Zener diodes Z1 to Z3. The component values are selected such that an input power supply of 240V RMS causes a switching or triggering phase angle which gives rise to an effective output power supply at the output terminals T3 of 110V RMS when VR1 is at full power setting. The switching or triggering phase angle of the triac THY1 can be set by control of the potentiometer VR1. The triac THY1 may be of the type BTA208X-600B. The diac DIAC1 may be of the type BR100/03.

In this example, the sixth and seventh resistors R6, R7 may be 470kΩ resistors, with the eighth resistor being a 4.7 kΩ resistor and the ninth resistor R9 being a 47Ω resistor. The eighth resistor R8 limits the maximum charging current into C4 when the potentiometer VR1 is at maximum power setting (zero Ohms) when in 110V mode. The potentiometer RV1 may be 500 kΩ, for example. The setting of the potentiometer VR1 determines the maximum output power. A higher resistance provides a lower maximum output power. If the maximum output power required is known, the potentiometer may be replaced by a suitable value fixed resistor (not shown). The values of the sixth and seventh resistors R6 and R7 may be altered to adjust the minimum power levels and the ratio between the 110V and 240V power settings. The component values indicated are selected to suit the speed settings of a 120V DC permanent magnet motor. Different values for the sixth and seventh resistors R6 and R7 are required to suit other devices, for example to optimise the brightness settings of a filament lamp or the speed settings of a half wave controlled universal motor.

When the power controller circuit is switched on by way of the power switch SW2 and the received power supply exceeds the threshold voltage of 120V RMS, the first transistor Q1 is turned on and the second transistor Q2 is turned off faster than the response time of the photoMOS relay SW1. Accordingly, transient operation in 110V mode is avoided.

Since the power controller 10 employs full wave phase control, it is convenient for the triac THY1 to be a high commutation triac. This minimises the risk of false triggering leading to high inrush currents. Additional snubbers or protection capacitors are not required to be connected to the high commutation triac THY1.

Because the photoMOS relay SW1 is of the normally open type, the power controller when non-operational necessarily is in the 240V input power supply mode. This is advantageous since it results in the power controller 10 being more resistant to high inrush currents when being switched on than it would be if the photoMOS SW1 were of the normally closed type. This limits a potentially high inrush current when switching on at 240V.

Combining the potentiometer VR1 with the power switch SW2 provides an additional inrush current limiting feature. In particular, the potentiometer VR1 can be arranged to provide initially and temporarily a maximum resistance across its terminals as the power switch SW2 is closed. In this way, high inrush currents flowing as the power switch SW2 is being closed are limited to the maximum extent by the potentiometer VR1.

Alternatively to providing an AC power supply at the output terminals T3, the power controller 10 can be arranged to provide a DC power supply. Here the output terminals T3 are omitted and instead a rectifier bridge is constructed in its place, shown by fifth to eighth diodes D5 to D8 in FIG. 1. Here, output terminals T2 connected at appropriate nodes of the diode bridge formed by the fifth to eighth diodes D5 to D8 provide a DC output to a DC load (not shown). Such a DC load may be, for example, a permanent magnet motor. The power ratings of the fifth to eighth rectifying diodes D5 to D8 clearly depends on the nature of the DC load. Each of the fifth to eighth diodes D5 to D8 may be, for example, 3.6 A axial leaded SOD64 package diodes, type BYM56C. If only an AC power supply output is required, the fifth to eighth rectifying diodes D5 to D8 and the output terminal T2 can be omitted.

An alternative embodiment is now described with reference to FIG. 2. In FIG. 2, reference numerals are obtained from FIG. 1 for like elements. Here, a power controller circuit 15 provides half-wave phase control using a silicon controlled rectifier, or thyristor, THY2. Such thyristors are often used for better speed control of AC universal motors, for example, electric drills and similar power tools. In this embodiment, a ninth diode D9 is connected in reverse bias across the fourth capacitor C4. This ensures that the thyristor THY2 only receives positive gate pulses. The thyristor THY2 may be of the type BT151X-650R. Operation of the remainder of the power controller 15 is substantially the same as that of the FIG. 1 power controller.

The above described power controllers can control the power supplied from power supplies of different voltage ratings to a load having an input voltage threshold such that the input voltage threshold is not exceeded. In particular, the controllers 11 control the trigger circuits 12 such that the trigger phase angle of the trigger circuit is retarded when the power supply voltage input to the controller exceeds the input voltage threshold of the load.

In this way, the power controller may enable a given load to be safely powered from power supplies of different voltage ratings, for example, different mains supplies. Manufacturers of electrical products including the power controller therefore need only produce a single version of a given product for sale in markets having different mains supplies, enabling manufacturing costs to be reduced. The power controller is cost effective to manufacture so may not substantially add to the cost of manufacturing an associated electrical product.

The principle employed by the controller described above can be used to produce a controller having two or more separated voltage thresholds. The controller can then provide an output signal dependent on which of the thresholds is exceeded by an input power supply, and the switching or triggering phase angle of the triac THY1 or the thyristor THY2 controlled accordingly. In this way, the power controller can be operable to provide a power supply to a load at or around a required voltage when the input power supply can take one of three or more voltage levels. For each threshold, a separate controller 11 and switching relay is required.

It will be appreciated that the power controller described herein may be used in combination with and/or incorporated in a wide range of electrical devices, including hand-held power tools, kitchen appliances, personal care, office equipment such as photocopiers, fax machines and the like. It may also be incorporated as a sub circuit in larger appliances such as incandescent lamp dimmers, low power heater controllers, motor speed controllers and fan controls, for example.

From the present disclosure, many other modifications and variations will be apparent to persons skilled in the art. Such modifications and variations may involve other features which are already known in the art and which may be used instead of or in addition to features already disclosed herein.

The invention claimed is:

1. A power controller for controlling the power supplied from power supplies of different voltage ratings to a load having an input voltage threshold, comprising a controller operable to control a trigger circuit to have a triggering phase angle greater when the power supply voltage received by the controller exceeds a first threshold dependent on the input voltage threshold of the load than when the first threshold is not exceeded, the controller being configured to include a circuit operable to produce a step signal change, for effecting the change in the resistance of the resistive circuit when the voltage of the input power supply exceeds the input voltage threshold of the load, and configured to effect change in the resistance of a resistive circuit forming part of the trigger circuit to control the triggering phase angle at a high phase angle in response to the power supply voltage input being at least as high as the voltage threshold, to provide power to the load at a reduced voltage, relative to the input voltage, and control the triggering phase angle at a low phase angle in response to the power supply voltage input being less than the voltage threshold, to provide power to the load at a voltage that is substantially the same as the voltage of the input voltage.

2. A power controller as claimed claim 1, in which the resistive circuit is operable to provide current for charging a capacitive circuit connected to the control electrode of a switching semiconductor circuit or device forming part of the trigger circuit.

3. A power controller as claimed in claim 1, arranged such that, before energization of the power controller, the resistive circuit has a resistance corresponding to that present when the voltage of the input power supply exceeds the input voltage threshold of the load.

4. A power controller as claimed in claim 1, wherein the controller is configured to operate a switch forming part of the resistive circuit.

5. A power controller as claimed in claim 4, wherein the switch is a relay.

6. A power controller as claimed in claim 5, wherein the switch is a photoMOS relay.

7. A power controller as claimed in claim 5, wherein the controller includes one or more Zener diodes.

8. A power controller as claimed in claim 4, wherein the switch is normally open.

9. A power controller as claimed in claim 1, wherein the resistive circuit includes a potentiometer.

10. A power controller as claimed in claim 9, wherein the potentiometer is connected with a power switch such that operation of the power switch controls the potentiometer temporarily to adopt a high resistance.

11. A power controller for controlling the power supplied from power supplies of different voltage ratings to a load having an input voltage threshold, comprising a controller operable to control a trigger circuit such that the trigger phase angle of the trigger circuit is retarded when the power supply voltage input to the controller exceeds the input voltage threshold of the load, the controller being configured to include a circuit operable to produce a step signal change, for effecting the change in the resistance of the resistive circuit when the voltage of the input power supply exceeds the input voltage threshold of the load, and configured to effect change in the resistance of a resistive circuit forming part of the trigger circuit to control the triggering phase angle at a high phase angle in response to the power supply voltage input being at least as high as the voltage threshold, to provide power to the load at a reduced voltage, relative to the input voltage, and control the triggering phase angle at a low phase angle in response to the power supply voltage input being less than the voltage threshold, to provide power to the load at a voltage that is substantially the same as the voltage of the input voltage.

12. An electrical power controller device for providing received power of different voltage ratings to a load having an input voltage threshold, the device comprising:
a trigger circuit having a variable triggering phase angle;
a controller circuit configured to
control the triggering phase angle at a high phase angle in response to t he received power having a voltage at least as high as the voltage threshold, to provide power to the load at a reduced voltage, relative to the voltage of the received power,
control the triggering phase angle at a low phase angle in response to the received power having a voltage that is less than the voltage threshold, to provide power to the load at a voltage that is substantially the same as the voltage of the received power;
a capacitor connected to the trigger circuit, the triggering phase angle being responsive to the speed at which the capacitor is charged,
a resistor connected to the capacitor, and
a switch to selectively bypass the resistor to control the speed at which the capacitor is charged, and
wherein the controller circuit is configured to control the switch to bypass the resistor in response to the voltage of the received power being below the threshold voltage, to control the triggering phase angle at the low phase angle.

13. Power controller for controlling the power supplied from power supplies of different voltage ratings to a load having an input voltage threshold, comprising a controller operable to control a trigger circuit to have a triggering phase angle greater when the power supply voltage received by the controller exceeds a first threshold dependent on the input voltage threshold of the load than when the first threshold is not exceeded, and
wherein for a power supply voltage exceeding the first threshold, power is supplied to the load at a reduced voltage relative to the received power supply voltage, and for a power supply voltage less than the first threshold, power is supplied to the load at a voltage that is substantially the same as the received power supply voltage, the controller being configured to effect change in the resistance of a resistive circuit forming part of the trigger circuit and to operate a switch forming part of the resistive circuit.

* * * * *